(12) United States Patent
Maric et al.

(10) Patent No.: US 11,181,973 B2
(45) Date of Patent: Nov. 23, 2021

(54) TECHNIQUES RELATED TO CONFIGURING A DISPLAY DEVICE

(71) Applicant: Apple Inc., Cupertino, CA (US)

(72) Inventors: Ivan S. Maric, Cupertino, CA (US); Edward S. Huo, Sunnyvale, CA (US); Akiko Ikkai, San Francisco, CA (US); Anna V. Mirabella, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/859,675

(22) Filed: Apr. 27, 2020

(65) Prior Publication Data

US 2020/0356163 A1 Nov. 12, 2020

Related U.S. Application Data

(60) Provisional application No. 62/845,447, filed on May 9, 2019.

(51) Int. Cl.
| | | |
|---|---|---|
| G09G 5/02 | (2006.01) | |
| G06F 3/01 | (2006.01) | |
| G06K 9/00 | (2006.01) | |
| G09G 5/10 | (2006.01) | |
| G06T 19/00 | (2011.01) | |

(52) U.S. Cl.
CPC .......... *G06F 3/011* (2013.01); *G06K 9/00281* (2013.01); *G06T 19/006* (2013.01); *G09G 5/10* (2013.01); *G09G 2354/00* (2013.01)

(58) Field of Classification Search
CPC ............................... G06F 3/011; G06T 19/006
See application file for complete search history.

(56) References Cited

U.S. PATENT DOCUMENTS

| | | | | |
|---|---|---|---|---|
| 2016/0358632 A1* | 12/2016 | Lakhani | ............... | H04N 9/8715 |
| 2017/0205875 A1* | 7/2017 | Kaehler | ............. | G06K 9/00671 |
| 2018/0046147 A1* | 2/2018 | Aghara | ................. | A61B 5/6803 |
| 2018/0173404 A1* | 6/2018 | Smith | ................... | G06T 19/006 |
| 2019/0222830 A1* | 7/2019 | Edwin | ................. | H04N 13/383 |

* cited by examiner

*Primary Examiner* — Charles Tseng
(74) *Attorney, Agent, or Firm* — Dentons US LLP

(57) ABSTRACT

The present disclosure describes techniques related to configuring display devices. For example, a method includes receiving sensor data corresponding to at least a portion of a face. The method further includes identifying, using the sensor data, a feature of the face. The method further includes identifying, based on the feature, a configuration parameter associated with the display device. The method further includes outputting the configuration parameter for changing a fit of the display device to the face.

30 Claims, 11 Drawing Sheets

TECHNIQUES RELATED TO CONFIGURING A DISPLAY DEVICE

RELATED APPLICATIONS

This application claims priority to U.S. Provisional Patent Application Ser. No. 62/845,447, entitled "TECHNIQUES RELATED TO CONFIGURING A DISPLAY DEVICE" and filed on May 9, 2019, the content of which is hereby incorporated by reference.

FIELD

This application relates generally to display devices, and more specifically to techniques related to configuring such display devices.

BACKGROUND

Display devices (e.g., head-mounted display (HMD) devices) are designed to provide content to users that are using such devices. As these devices are used for longer periods of times, individualized configuration of the display devices becomes more and more important.

SUMMARY

The present disclosure describes techniques related to configuring display devices to enhance the fit of the display devices for a person. In accordance with some examples, a method related to configuring a head-mounted display device is described. The method comprises receiving sensor data corresponding to at least a portion of a face, identifying, using the sensor data, a feature of the face, identifying, based on the feature, a configuration parameter associated with the head-mounted display device, and outputting the configuration parameter for changing a fit of the head-mounted display device to the face.

In some examples, the configuration parameter is a recommendation of an adjustment to the head-mounted display device. In some examples, the configuration parameter is a size, shape, or model number of a physical component associated with the head-mounted display device.

In some examples, the method further comprises outputting a second configuration parameter for changing a software component of the head-mounted display device. In some examples, the software component is a brightness of a display of the head-mounted display device.

In some examples, the configuration parameter is identified based on a plurality of features of the face. In some examples, the plurality of features include at least one or more of an ear location relative to another feature of the face, a head size, a head shape, a configuration parameter for hardware of the head-mounted display device, an attribute of a nose of the face, an attribute of one or more cheeks of the face, an attribute of one or more eyes of the face, or an attribute of a facial feature (e.g., a forehead, an ear, a chin, skin, etc.). In some examples, the configuration parameter is identified based on the depth of the forehead of the face with respect to one or more eyes of the face or a position of a first anthropometric facial landmark (e.g., the cheekbones of the face) with respect to one or more other anthropometric facial landmarks.

In some examples, outputting the configuration parameter causes the head-mounted display device to change a size of a hardware component of the head-mounted display device. In some examples, the head-mounted display device includes a display for outputting computer-generated reality content. In some examples, the feature of the face corresponds to a topology of the face.

In some examples, the method further comprises identifying a current physical component coupled to the head-mounted display device, and, in accordance with a determination that the current physical component is not configured consistent with the configuration component, displaying a recommendation to replace the current physical component with a different physical component that is configured consistent with the configuration parameter. In some examples, the current physical component is a replaceable cushion.

In some examples, the current physical component includes a component to communicate one or more characteristics of the current physical component to the head-mounted display device. In some examples, the current physical component is identified based on the one or more characteristics.

In some examples, the method further comprises, after receiving the sensor data, receiving second sensor data, identifying, based on the second sensor data, a refined configuration parameter associated with the head-mounted display device, and outputting the refined configuration parameter for changing a fit of the head-mounted display device to the face. In some examples, the sensor data is a first type and the second sensor data is a second type different from the first type. In some examples, the second sensor data corresponds to use of the head-mounted display device. In some examples, the sensor data is captured by a sensor of the head-mounted display device. In some examples, the sensor data is captured by a sensor of a computing device different from the head-mounted display device. In some examples, the sensor is an image sensor, a depth sensor, or a temperature sensor.

In some examples, the method further comprises receiving, by an application of the computing device, a request to capture one or more images, in response to the request, capturing, by an image sensor of the computing device (e.g., an inward-facing (sometimes referred to as user facing or backward facing) or outward-facing (sometimes referred to as forward facing) image sensor), an image, and displaying, by the application, a representation of a physical component of the head-mounted display device. In some examples, the sensor data includes the image. In some examples, the physical component is identified based on the configuration parameter.

In some examples, the method further comprises, in response to receiving user selection of an affordance associated with the physical component, sending, by the computing device, a request for the physical component.

In some examples, the method further comprises displaying a plurality of representations of physical components associated with the head-mounted display device, receiving a selection of an affordance corresponding to a physical component of the plurality of physical components, sending a request for the physical component, and after sending the request, receiving a selection to purchase the physical component. In some examples, each of the plurality of representations corresponds to the same part of the head-mounted display device.

In accordance with some examples, a non-transitory computer-readable storage medium is described. The non-transitory computer-readable storage medium storing one or more programs configured to be executed by one or more processors of an electronic device, the one or more programs including instructions for receiving sensor data corresponding to at least a portion of a face, identifying, using the sensor data, a feature of the face, identifying, based on the feature, a configuration parameter associated with the head-mounted display device, and outputting the configuration parameter for changing a fit of the head-mounted display device to the face.

In accordance with some examples, a transitory computer-readable storage medium is described. The non-transitory computer-readable storage medium storing one or more programs configured to be executed by one or more processors of an electronic device, the one or more programs including instructions for receiving sensor data corresponding to at least a portion of a face, identifying, using the sensor data, a feature of the face, identifying, based on the feature, a configuration parameter associated with the head-mounted display device, and outputting the configuration parameter for changing a fit of the head-mounted display device to the face.

In accordance with some examples, an electronic device is described. The electronic device comprises one or more processors and memory storing one or more programs configured to be executed by the one or more processors, the one or more programs including instructions for receiving sensor data corresponding to at least a portion of a face, identifying, using the sensor data, a feature of the face, identifying, based on the feature, a configuration parameter associated with the head-mounted display device, and outputting the configuration parameter for changing a fit of the head-mounted display device to the face.

In accordance with some examples, an electronic device is described. The electronic device comprises: means for receiving sensor data corresponding to at least a portion of a face, identifying, using the sensor data, a feature of the face, identifying, based on the feature, a configuration parameter associated with the head-mounted display device, and outputting the configuration parameter for changing a fit of the head-mounted display device to the face.

Figure 1A:
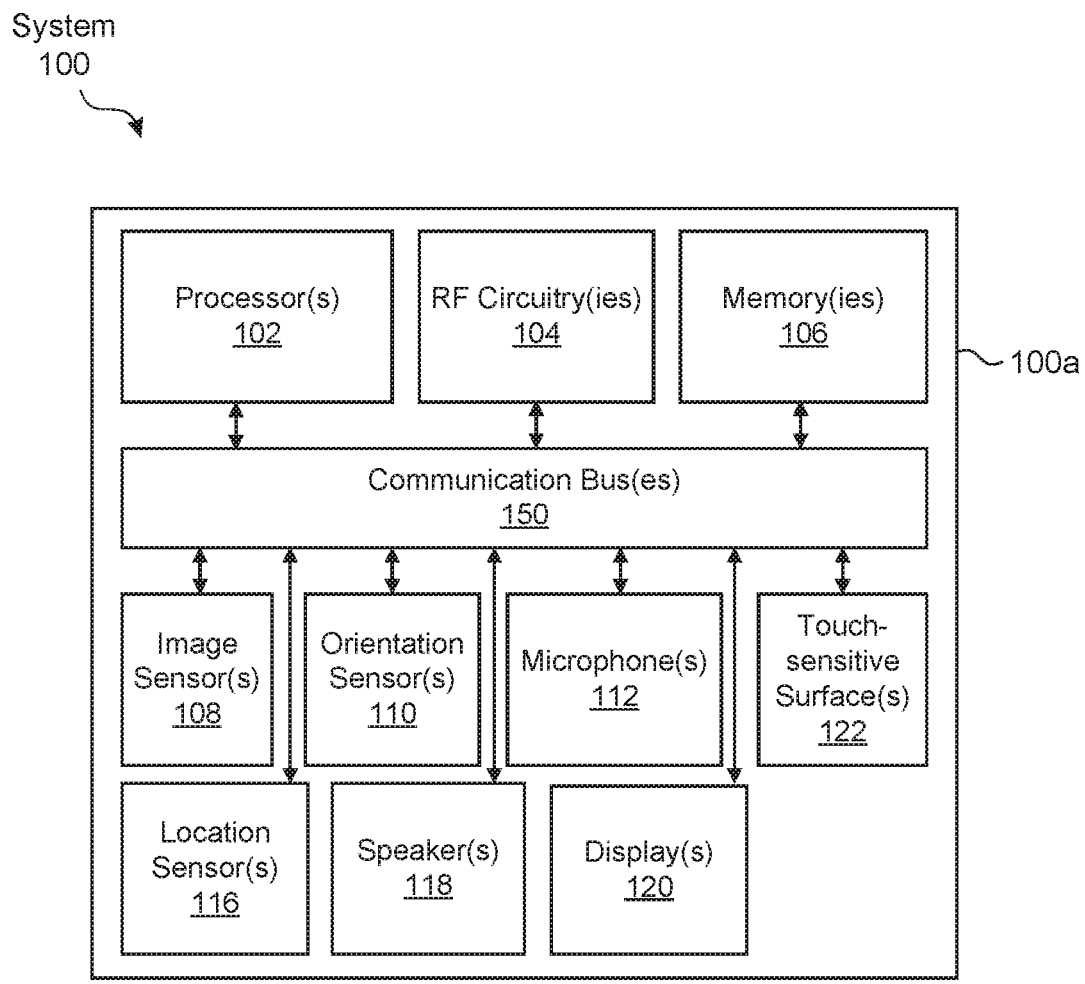
FIGS. 1A-1B depict exemplary systems for use in various computer-generated reality technologies, including virtual reality and mixed reality.

The examples depicted in the figures are only exemplary. One skilled in the art will readily recognize from the following discussion that alternative examples of the structures and methods illustrated herein can be employed without departing from the principles described herein.

DETAILED DESCRIPTION

The following description sets forth specific configurations, parameters, and the like. It should be recognized, however, that such description is not intended to limit the present disclosure, but is instead provided as a description of exemplary examples.

Various examples of electronic systems and techniques for using such systems in relation to various computer-generated reality technologies, including virtual reality and mixed reality (which incorporates sensory inputs from a physical environment), are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
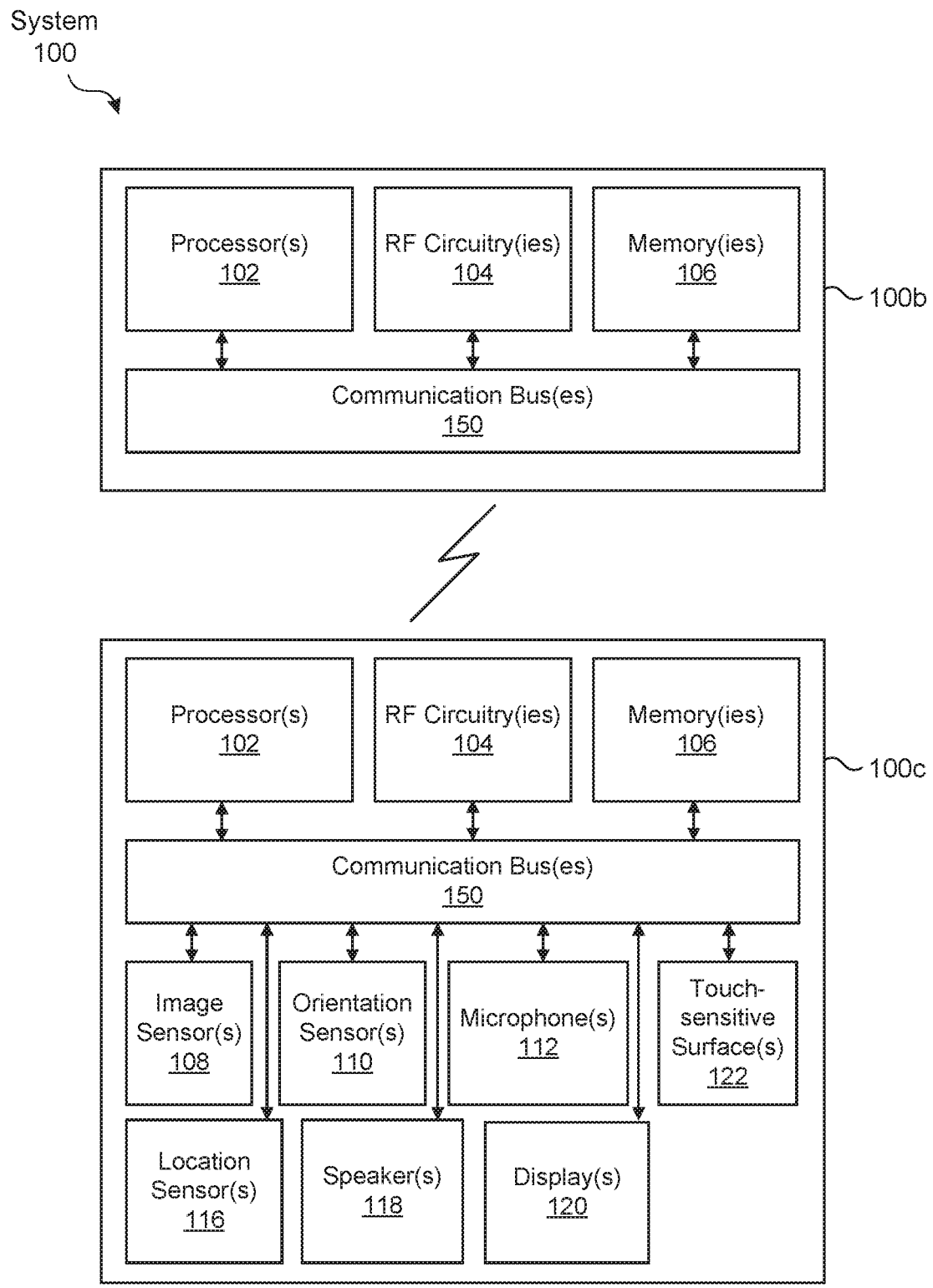

FIG. 1A and FIG. 1B depict exemplary system 100 for use in various computer-generated reality technologies, including virtual reality and mixed reality.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

As briefly discussed above, the present disclosure describes techniques related to configuring display devices (e.g., wearable display devices) to enhance the fit of the display devices on a person. The configuring is, optionally, based on an image of the person. Such techniques can be implemented in different scenarios, each scenario potentially involving different steps.

For example, a first scenario can take place at a person's home. In such a scenario, a process related to configuring a display device can include the person navigating to an application executing on their mobile device, the application corresponding to display devices. The application is configured to allow the person to capture an image of their face. Based on the image, one or more landmarks are identified in the face. The one or more landmarks are then used to determine a configuration recommendation for the display device. The configuration recommendation can include an identification of a hardware component or a software setting for the display device, such as a size of a cushion or a brightness setting.

A second scenario can again take place at a person's home. In such a scenario, a process related to configuring a display device can include the person putting on the display device. At some point either before, during, or after the point of time that the display device is initially put on the person, the display device captures an image of the person's face. Based on the image, the display device can output a recommendation (as described above) or cause a component of the display device (e.g., an adjustable cushion) to change to improve the fit of the display device on the person.

A third scenario can take place at a merchant location. In such a scenario, a process related to configuring a display device can include a kiosk at the merchant location receiving an image of a face. The image is used to provide one or more recommendations for configurations of a display device that fit the face. The one or more recommendations can either be displayed to the person or brought to the person for the person to try themselves.

To discuss the techniques described in the present disclosure, references will be made to a head-mounted display device. It should be recognized that other types of display devices may be used.

Figure 2A:
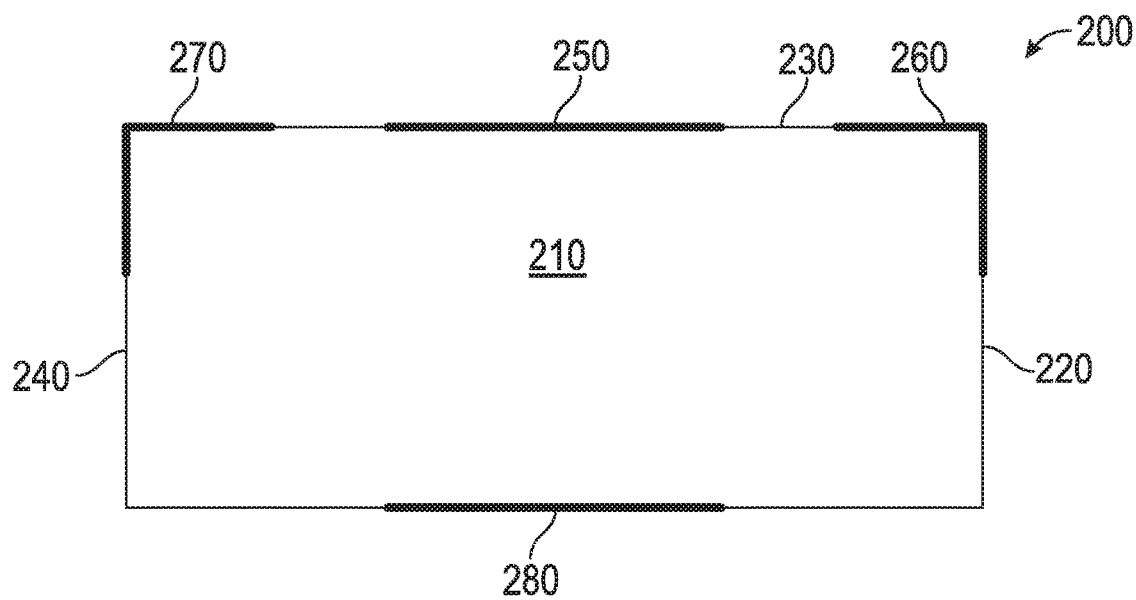
FIG. 2A illustrates an example of a front view of a head-mounted display device in accordance with some examples of this disclosure.

FIG. 2A illustrates a front view of head-mounted display device 200. Head-mounted display device 200 includes several physical components that can be modified to change the fit of head-mounted display device 200. While particular components will be discussed below with reference to FIGS. 2A-2B, it should be recognized that more or less components and/or different components than discussed may be configurable. The discussion below is intended to merely provide examples.

Head-mounted display device 200 includes front casing 210. In some examples, front casing 210 is a lens that is at least partially transparent such that a person can see through front casing 210. In other examples, front casing 210 is opaque to prevent a person from seeing through front casing 210. Front casing 210 can be configurable in a number of ways, including size, shape, color, level of transparency, weight, material, thickness, or the like.

Head-mounted display device 200 includes left casing 220, top casing 230, and right casing 240 (referred to as side casings). Each of the side casings are coupled to front casing 210 and extend at least partially perpendicular to front casing 210. In some examples, each of the side casings can be the same or different material from front casing 210. For example, front casing 210 can be glass while the side casings can be plastic. Similar to front casing 210, each of the side casings can be configurable in a number of ways, including size, shape, color, level of transparency, weight, material, thickness, or the like.

Head-mounted display device 200 includes a number of cushions (e.g., center cushion 250, left cushion 260, right cushion 270, and nose cushion 280). Some of the cushions (e.g., center cushion 250, left cushion 260, and right cushion 270) are illustrated as coupled to the side casings. Another cushion (e.g., nose cushion 280) is illustrated as coupled to front casing 210. It should be recognized that such couplings can be different than illustrated (e.g., center cushion 250 can be coupled to front casing 210 or nose cushion 280 can be coupled to a side casing). The cushions can be configurable in a number of ways, including size, shape, color, weight, material, thickness, or the like.

Figure 2B:
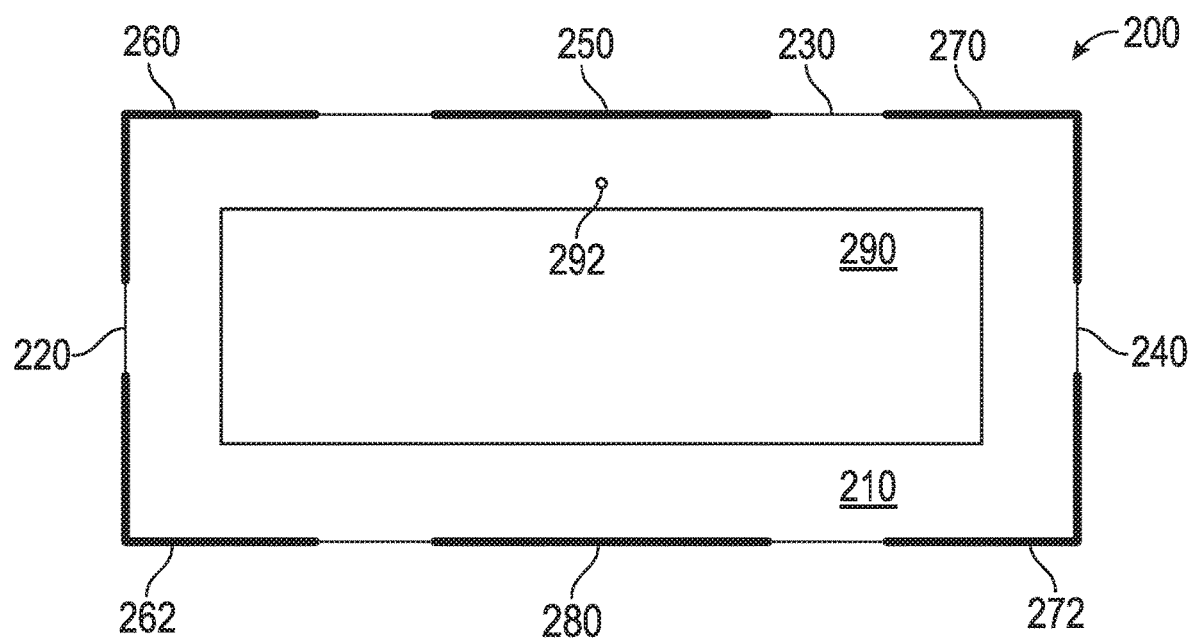
FIG. 2B illustrates an example of a rear view of a head-mounted display device in accordance with some examples of this disclosure.

FIG. 2B illustrates a rear view of head-mounted display device 200. The rear view illustrates a view that a person would have when putting on head-mounted display device 200.

The rear view shows head-mounted display device 200 includes bottom left cushion 262 and bottom right cushion 272. The rear view further shows head-mounted display device 200 includes display screen 290. While depicted as a single screen, it should be recognized that display screen 290 may be different (e.g., split into multiple screens, each screen for each eye).

Head-mounted display device 200, as depicted in FIG. 2B, includes capture device 292 (e.g., an image sensor). Capture device 292 can be used to capture an image of a person, or to otherwise detect physical characteristics of the person. The image/data can then be used as discussed below.

Figure 3:
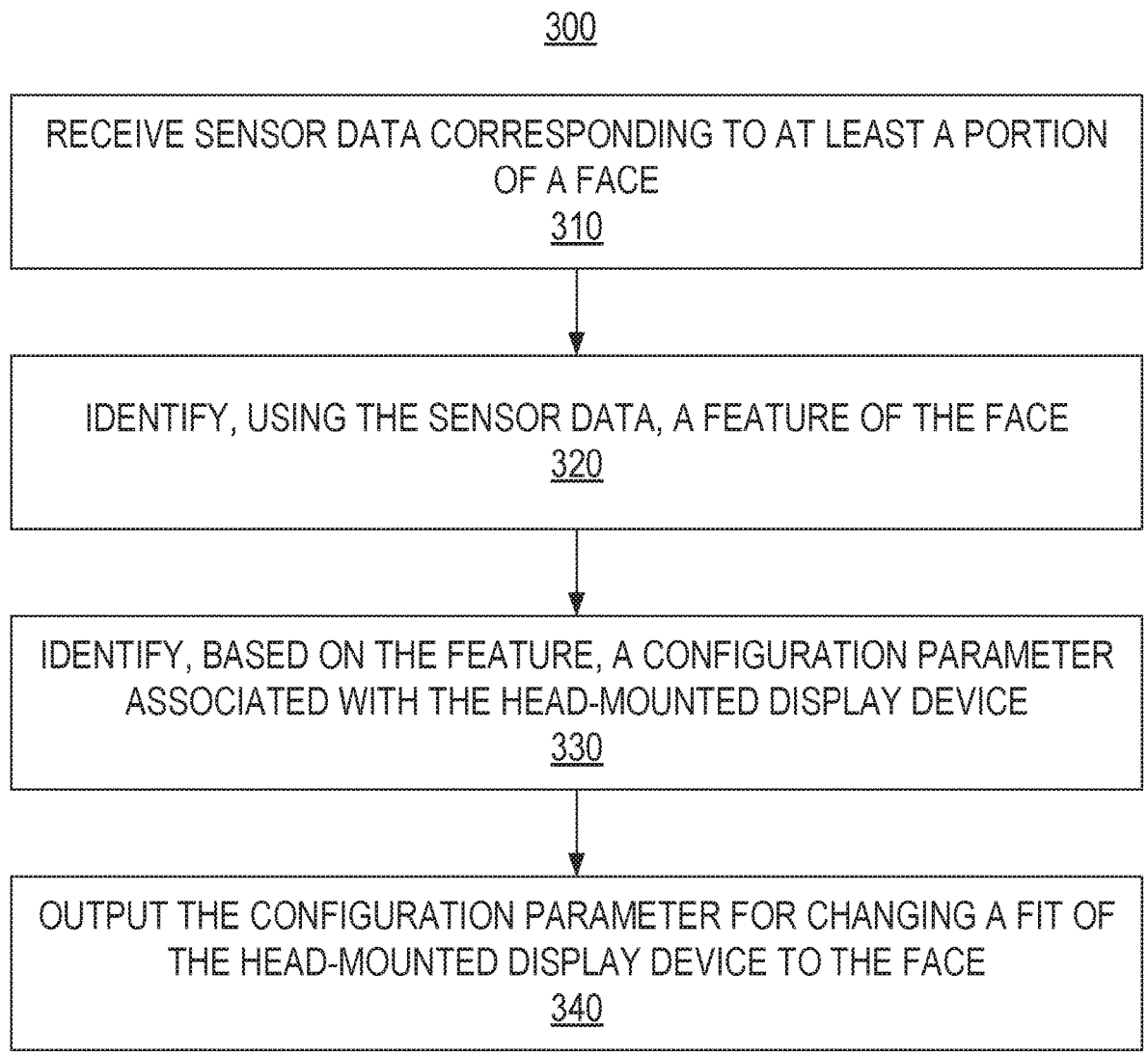
FIG. 3 is a flow diagram illustrating a method related to configuring a head-mounted display device in accordance with some examples of this disclosure.

FIG. 3 is a flow diagram illustrating a method related to configuring a head-mounted display device. The method can be performed by an electronic device (e.g., device 100*a*). In some examples, the electronic device has one or more sensor devices (e.g., image sensor(s) 108, orientation sensor(s) 110, location sensor(s) 116). In some examples, the electronic device is connected to and in communication with one or more sensor devices (e.g., image sensor(s) 108, orientation sensor(s) 110, location sensor(s) 116) that are separate from the device.

In some examples, the electronic device is the head-mounted display device. In some examples, the electronic device is separate from but is secured on (or configured to be secured to) a head-mounted device. In some examples, the electronic device is a mobile device, a laptop, a tablet, or the like (as further discussed in FIGS. 4A-4C). In some examples, the electronic device is a kiosk at a merchant location (as further discussed in FIGS. 5A-5B). In some examples, the electronic device is a remote server for processing data, the remote server receiving communications from devices (e.g., a mobile device or a kiosk).

In some examples, the electronic device has a display. In some examples, the display is at least partially transparent. In some examples, the electronic device is connected to and in communication with a display that is separate from the device. In some examples, the electronic device includes one or more speakers (e.g., speaker(s) 118) for outputting audio. In some examples, the electronic device is connected (or configured to be connected) to (e.g., via wireless connection, via wired connection) and in communication (or configured to be in communication) with one or more speakers (e.g., speaker(s) 118) for outputting audio.

At block 310, the electronic device (e.g., 100*a*) receives sensor data corresponding to at least a portion of a face of a person. In one example, the sensor data is an image of the face; however, it should be recognized that the sensor data can be different, such as data captured by a depth sensor, a temperature sensor, or the like. In some examples, the sensor data is captured by a sensor of (e.g., attached or coupled to) the head-mounted display device. In other examples, the sensor data is captured by a sensor of a computing device different from (e.g., external to) the head-mounted display device (e.g., a mobile device or a kiosk).

At block 320, a feature (sometimes referred to as a landmark) of the face is identified. In some examples, the electronic device identifies the feature. In some examples, the feature is identified using the sensor data. In some examples, the feature of the face corresponds to a topology of the face. Examples of features include a distance between the eyes of the person, a size or other characteristics of a forehead of the person, a width of an eye of the person, a difference in depth of the forehead with respect to a depth of one or more eyes of the person, a difference in depth of one or more cheek bones of the person with respect to the depth of the one or more eyes, a gaze angle of the person, a width of a nose of the person, a position of the cheekbones of the face with respect to the one or more eyes, a curvature of a cornea, length of nose, proportion of length of nose to width of nose, length of protrusion of nose relative to other features such as the cheek, forehead, or chin, relative position of the chin relative to other features, location of a person's mouth or lips, shading of the skin, features related to eyelids and eyelashes, features related to additional facial features such as moles or freckles, a mapping of an eye socket region around an eye (to inform of any potential fit interferences), a prescription of a user, eyelash length, width of a user's nose bridge, distance between a user's ears, a head length, a head width, a head height, a head circumference, a location of a known anthropometric landmark (e.g., a diagram that indicates facial landmarks), or any combination thereof.

At block 330, a configuration parameter associated with the head-mounted display device is identified based on one or more features of the face (e.g., the feature discussed above for block 320). In some examples, the configuration parameter is identified based on one or more rules that are configured to produce configurations that improve the experience of the person (e.g., increase the fit). For example, a rule can indicate to use a particular cushion when a person has a particular depth for their forehead.

In some examples, the configuration parameter is a recommendation of an adjustment to the head-mounted display device. In some examples, the configuration parameter is a size, shape, or model number of a physical component associated with the head-mounted display device (e.g., an accessory such as a head-held device).

In some examples, the configuration parameter relates to a software component of the head-mounted display device. In such examples, the configuration parameter relates to changing how the software component performs, such as a different user interface or a different process when a particular event occurs. In some examples, the software component is a brightness of a display of the head-mounted display device.

In some examples, the electronic device identifies the configuration parameter. In other examples, the configuration parameter is identified by a device remote from the electronic device. In such examples, information corresponding to the sensor data (e.g., measurements of the face) or the feature is sent to the remote device from the electronic device. The remote device then identifies the configuration parameter.

At block 340, the configuration parameter is output for changing a fit of the head-mounted display device to the face. In some examples, the electronic device outputs the configuration parameter.

Outputting can include displaying the configuration parameter, sending a message to obtain (e.g., purchase) a component configured consistent (or configured to accommodate a face) with the configuration parameter, sending a message to cause the head-mounted display device to physically change such that the head-mounted display device is in accordance with the configuration parameter, or the like. In some examples, outputting the configuration parameter causes the head-mounted display device to physically change based on the configuration parameter (e.g., change a size (e.g., a volume) of a hardware component of the head-mounted display device).

In some examples, the method further comprises identifying a current physical component coupled to the head-mounted display device and, in accordance with a determination that the current physical component is not configured consistent (or in accordance with a determination that the current physical component is not configured to accommodate a face with the configuration parameter), displaying a recommendation to replace the current physical component with a different physical component that is configured consistent with the configuration parameter (or that is configured to accommodate a face with the configuration parameter). In some examples, in accordance with a determination that the current physical component is configured consistent (or in accordance with a determination that the current physical component is configured to accommodate a face with the configuration parameter), foregoing display of the recommendation. In some examples, the current physical component is a replaceable cushion. In some examples, the current physical component includes a component to communicate one or more characteristics of the current physical component to the head-mounted display device, where the current physical component is identified based on the one or more characteristics. For example, the current physical component (or the head-mounted display device) can include an arrangement of one or more magnets, a near-field communication tag or chip, radio frequency identification tag or chip, a mechanical key that corresponds to a particular SKU, a push-push or button mechanism that corresponds to a particular SKU and latches to a different part of the head-mounted display device depending on a size of a physical component (e.g., a cushion), a laser etch or other color pattern which is read by a camera, a cosmetic tag exposed to or visible to an infrared camera, a physical marker that is visible from a sensor/camera (e.g., a barcode or a symbol). In another example, the head-mounted display device can include contact electrodes that communicate directly with the current physical component. In another example, the current physical component can include contact electrodes that communicate directly with the head-mounted display device.

In some examples, the method further comprises receiving second sensor data after receiving the sensor data, identifying, based on the second sensor data, a refined configuration parameter associated with the head-mounted display device, and outputting the refined configuration parameter for changing a fit of the head-mounted display device. For example, the person can be wearing a headband. In the example, the second sensor data is indicative of the headband, causing the refined configuration parameter to take into account that the person is wearing the headband.

In some examples, the sensor data is a first type and the second sensor data is a second type different from the first type. For example, the sensor data is an image and the second sensor data is a current temperature.

In some examples, the second sensor data corresponds to use of the head-mounted display device. For example, the second sensor data can be an application that has been previously (or currently) used on the head-mounted display device.

In some examples, the sensor data is an image from a first image sensor (e.g., an inward-facing image sensor) and the second sensor data is an image from a second image sensor (e.g., an outward-facing image sensor). In such examples, the sensor data can provide information related to a face of the person and the second sensor data can provide information related to an environment where the person is located.

Figure 4A:
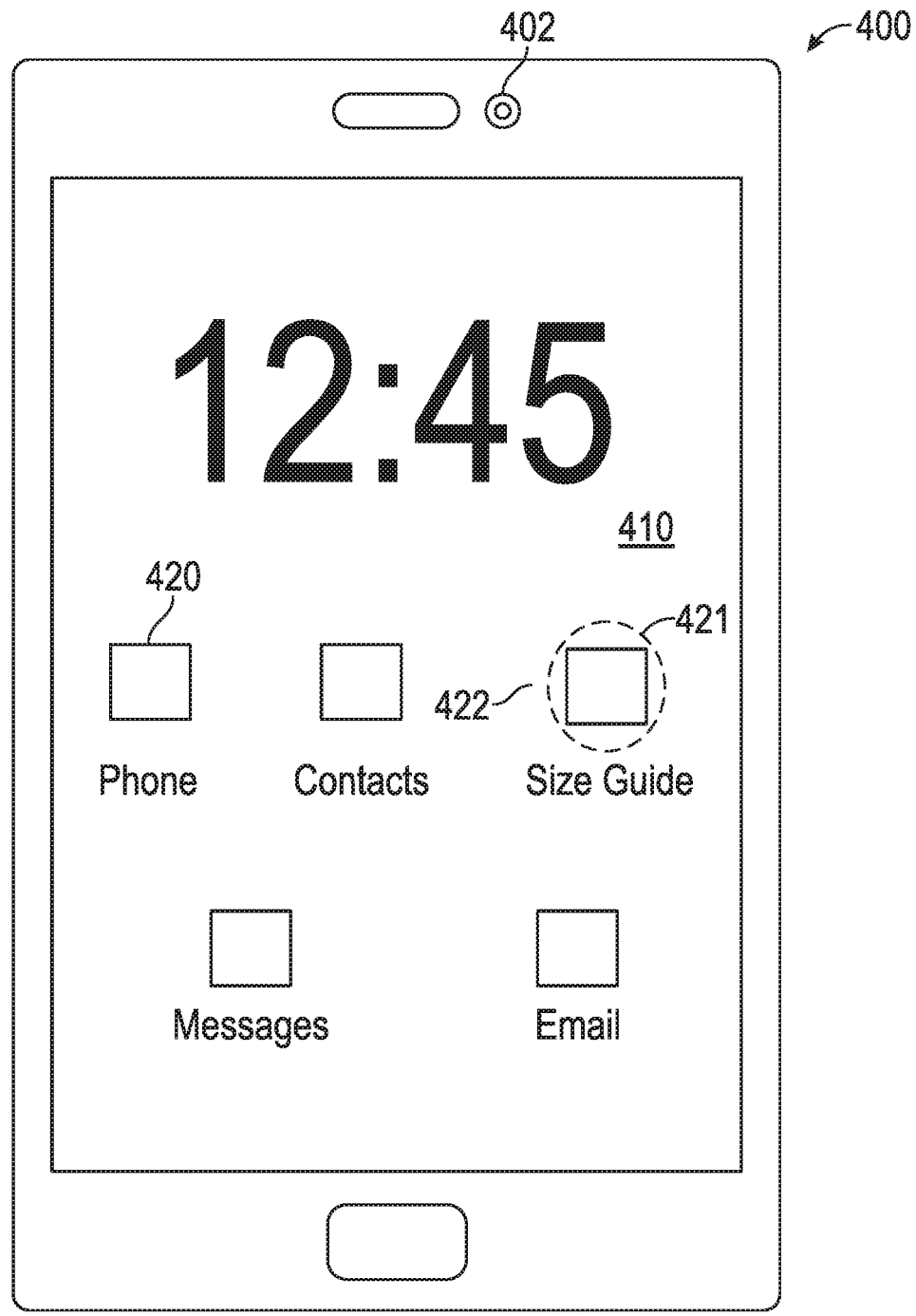
FIGS. 4A-4C illustrate an experience of a person obtaining a head-mounted display device using the person's device in accordance with some examples of this disclosure.
Figure 4B:
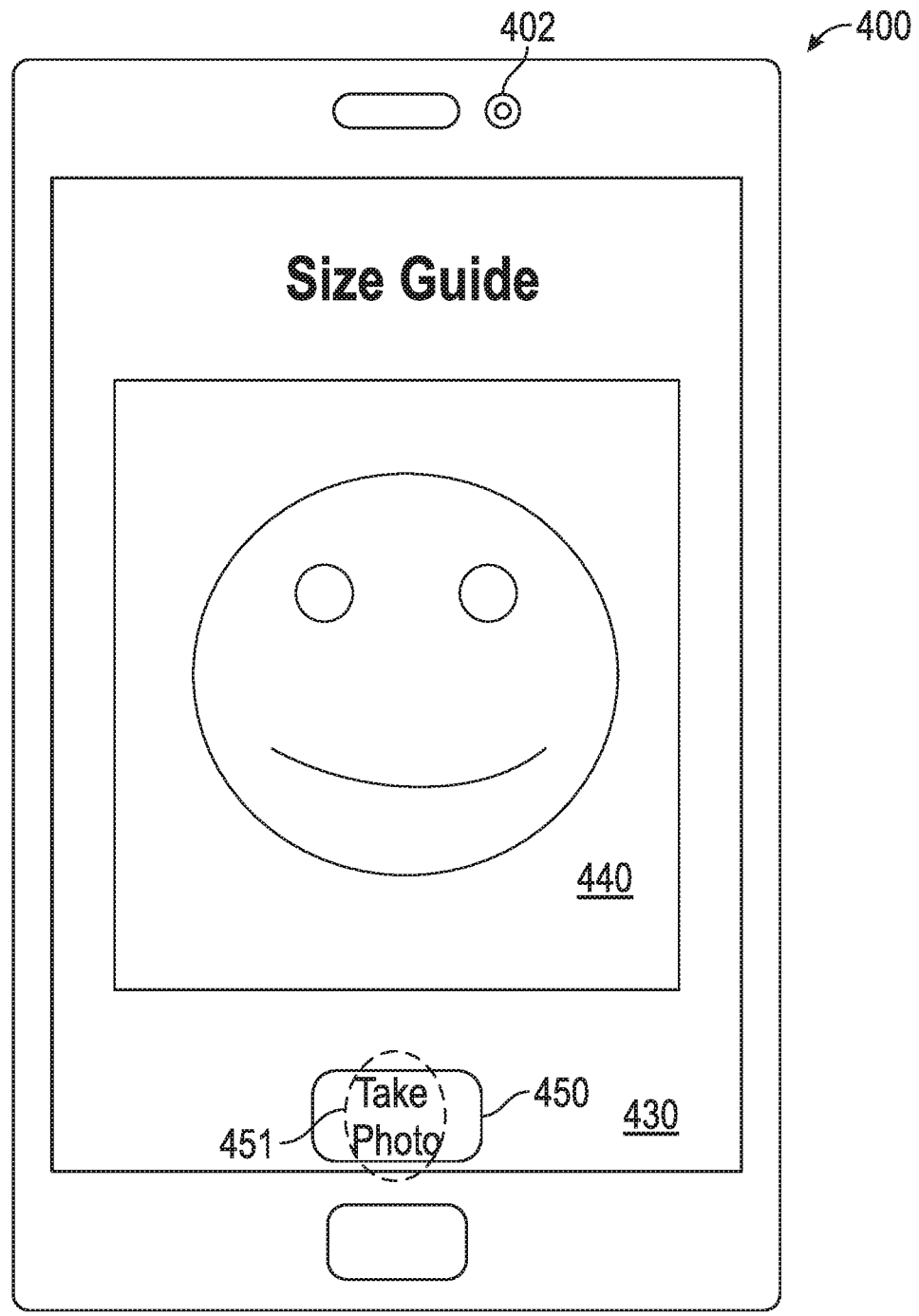
Figure 4C:
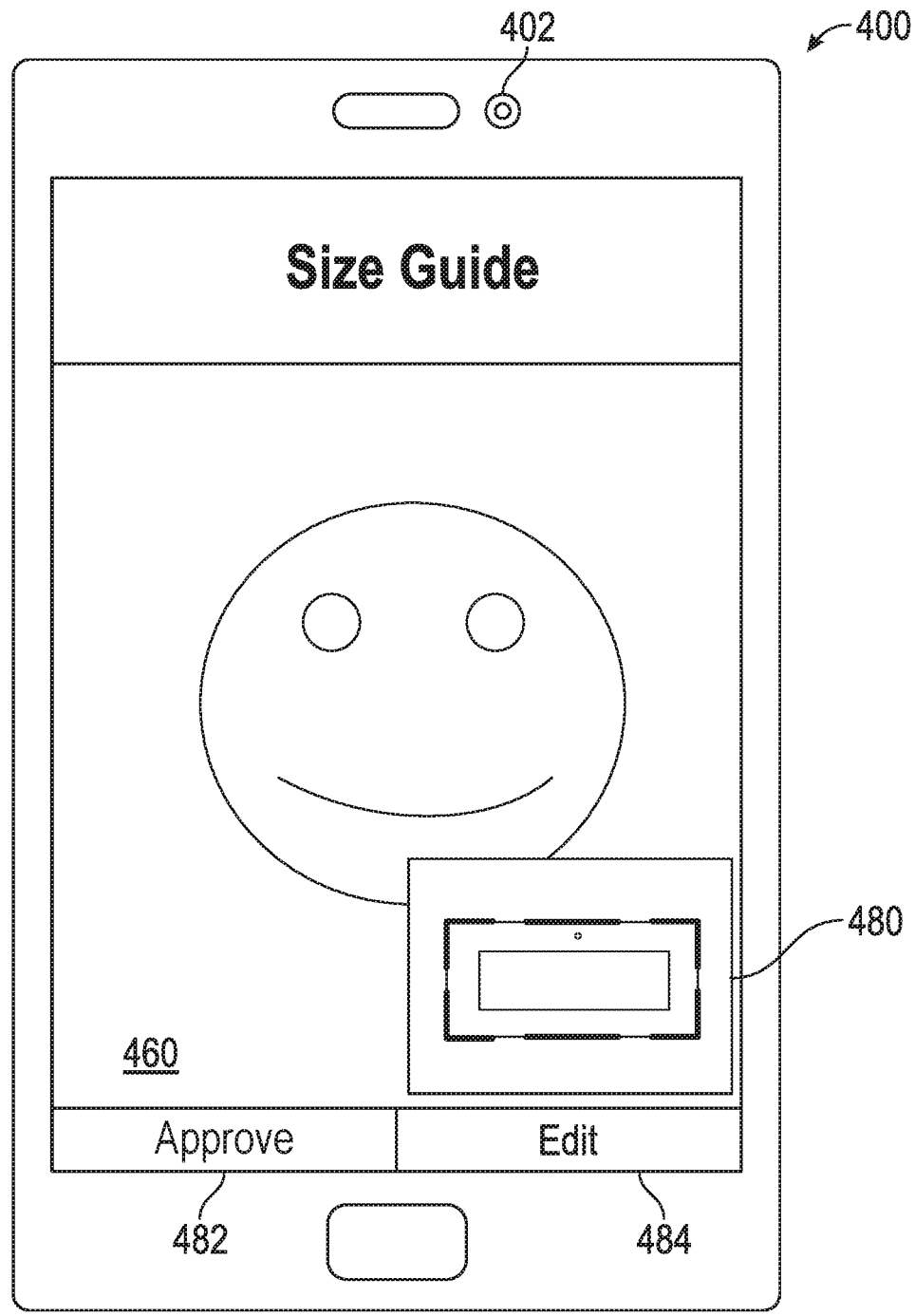

In some examples, the method further comprises receiving, by an application of the computing device, a request to capture an image, wherein the sensor data includes the image, in response to the request, capturing, by an inward-facing image sensor of the computing device, an image, where the sensor data includes the image, and displaying, by the application, a representation of a physical component of the head-mounted display device, where the physical component is identified based on the configuration parameter (as further discussed below with reference to FIGS. 4A-4C). In some examples, the method further comprises in response to receiving user selection of an affordance associated with the physical component, sending, by the computing device, a request for the physical component.

Figure 5A:
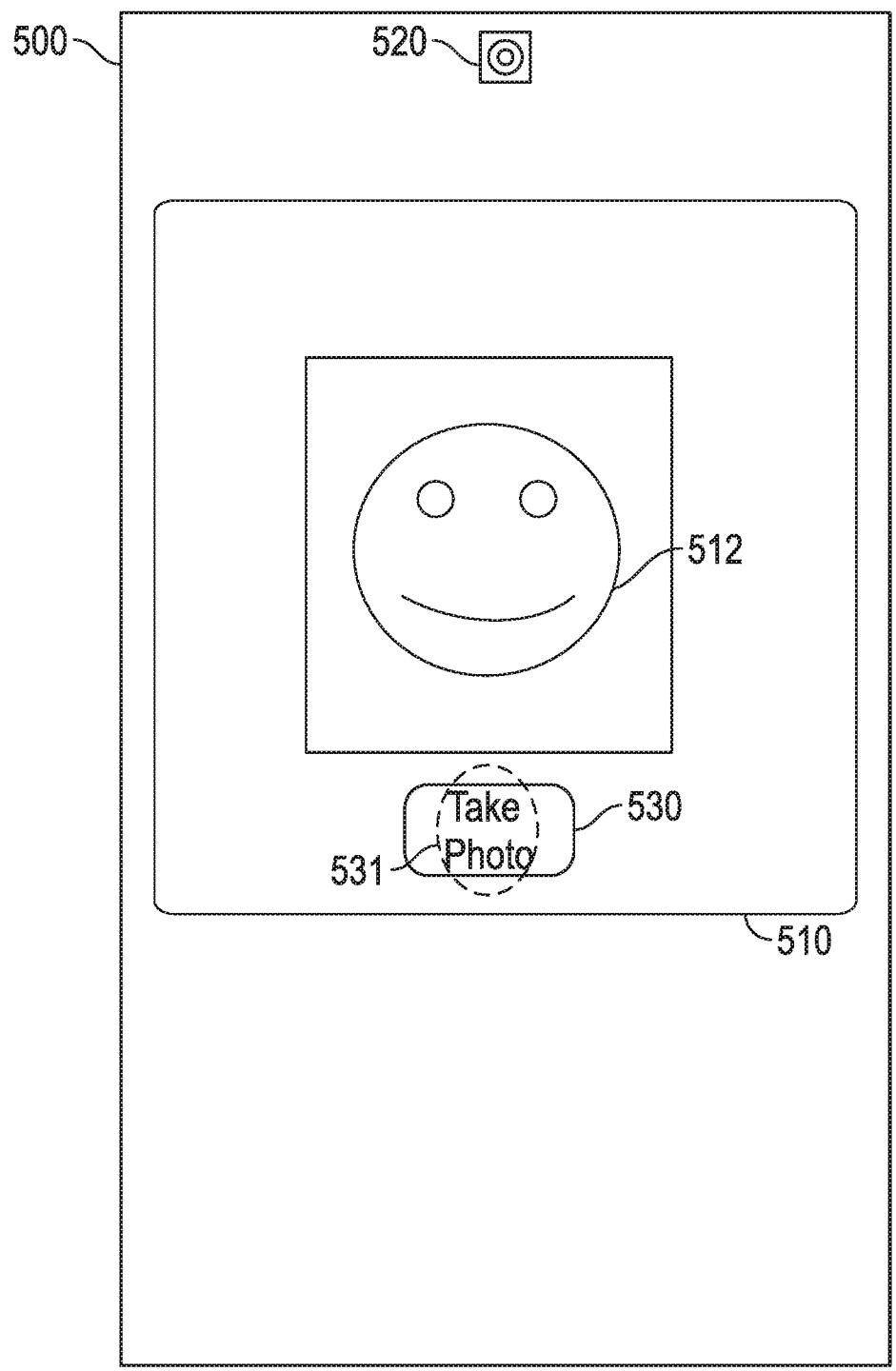
FIGS. 5A-5B illustrate an experience of a person purchasing a head-mounted display device using a device of another in accordance with some examples of this disclosure.
Figure 5B:
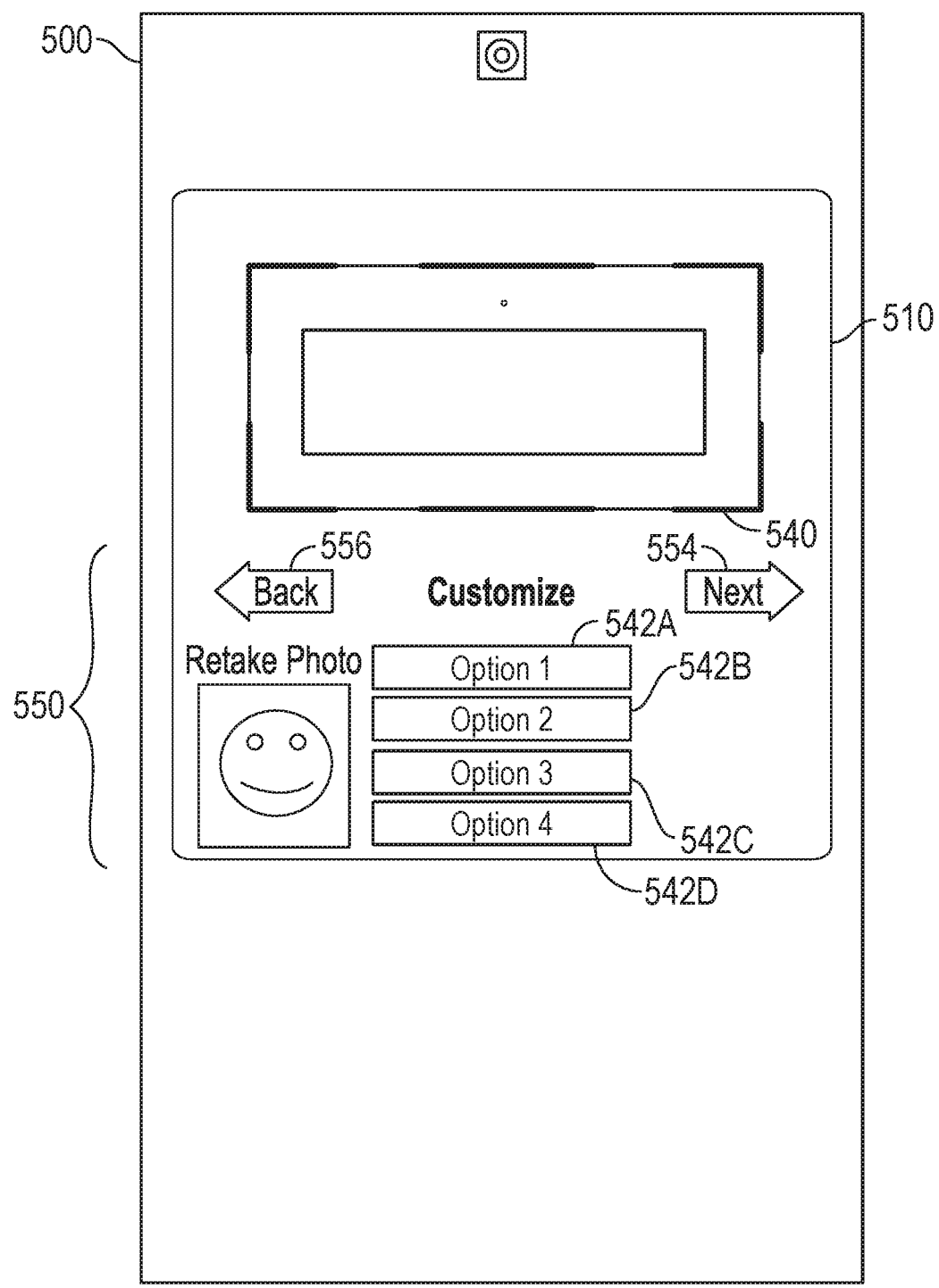

In some examples, the method further comprises: displaying a plurality of representations of physical components associated with the head-mounted display device, wherein each of the plurality of representations corresponds to the same part of the head-mounted display device, receiving a selection of an affordance corresponding to a physical component of the plurality of physical components, sending a request for the physical component, and after sending the request, receiving a selection to purchase the physical component (as further discussed below with reference to FIGS. 5A-5B).

FIGS. 4A-4C illustrate an experience of a person obtaining a head-mounted display device using the person's device (e.g., a mobile device, such as a mobile phone, a tablet, a laptop, or the like). The experience begins with the person accessing the person's device, which can begin on a home screen, as discussed below. It should be recognized that the flow of FIGS. 4A-4C is merely an example of a potential flow and should not be limiting.

FIG. 4A illustrates home screen 410 being displayed on mobile device 400. In the example depicted in FIG. 4A, mobile device 400 includes a touch-sensitive display and an inward-facing camera (e.g., image sensor 402). It should be recognized that other types of mobile devices may be used.

Home screen 410 includes multiple icons, each icon corresponding to a different application. For example, icon 420 corresponds to a phone application and icon 422 corresponds to a size-guide application (which is further discussed below). Selection of an icon causes a corresponding application to be executed. FIG. 4A depicts selection (e.g., touch 421 on the touch-sensitive display) of icon 422. The selection causes the size-guide application to execute.

FIG. 4B illustrates user interface 430 for capturing an image of a face. User interface 430 is a user interface of the size-guide application. In some examples, user interface 430 is displayed in response to selection of icon 422, as discussed above for FIG. 4A. It should be recognized that other user interfaces of the size-guide application may be presented prior to user interface 430.

User interface 430 includes content frame 440, which displays content captured by an image sensor of mobile device 400 (e.g., image sensor 402). In FIG. 4B, the content is a face of a person. User interface 430 further includes affordance 450. Selection of affordance 450 (e.g., touch 451 on the touch-sensitive display) causes the content being displayed in content frame 440 (or content being captured by the image sensor) to be stored as a captured image. In some examples, selection of affordance 450 further causes the captured image to be analyzed (either locally or remotely) to identify a recommendation for a display device.

When analyzed remotely, privacy of the person can be taken into account. In particular, while the captured image can be sent to a remote server, content less than the captured image can be sent to the remote server. In some examples, the content sent to the remote server includes one or more values calculated based on the captured image (e.g., distance between eyes, length of nose, distance from eyes to nose, depth of the forehead relative to the eyes, depth of the cheek bones relative to the eyes, or the like). In some examples, the content sent to the remote server is a portion of the captured image, the portion including less than the entire face. In some examples, identification information corresponding to mobile device 400 can also be sent to the remote server.

FIG. 4C illustrates user interface 460 for providing a recommendation. User interface 460 is another user interface of the size-guide application. In some examples, user interface 460 is displayed in response to receiving a recommendation. The recommendation can be received from a remote server (when the analysis is performed remotely) or from a process of the size-guide application (when the analysis is performed locally). It should be recognized that other user interfaces of the size-guide application may be presented after user interface 430 and prior to user interface 460.

User interface 460 includes display of content captured by image sensor 402. The content can either be newly captured content or the content that was used to determine the recommendation. A representation of a head-mounted display device can be displayed on top of the content displayed in user interface 460 such that it appears that the head-mounted display device is being worn by the person in the content, providing a visual representation of how the head-mounted display device will fit (not illustrated).

User interface 460 further includes content frame 480, depicting another view of the head-mounted display device. The view in content frame 480 shows configurations that are recommended for the person. In some examples, selection of a particular piece of a configuration causes additional information regarding the particular piece to be displayed. In some examples, user interface 460 further includes approve affordance 482 and edit affordance 484. Selection of approve affordance 482 causes a configuration of a head-mounted display device to be approved (e.g., the configuration based on the recommendation) and, in some examples, to be ordered. Selection of edit affordance 484 causes a user interface to be displayed that allows a user to change one or more pieces of a head-mounted display device to change the fit.

FIGS. 5A-5B illustrate an experience of a person purchasing a head-mounted display device using a device of another (e.g., a kiosk at a merchant location). The experience begins with the person arriving at the merchant location.

The merchant location includes kiosk 500, as depicted in FIG. 5A. Kiosk 500 includes display 510 and image sensor 520. Display 510 is displaying content captured by image sensor 402. In particular, the content in FIG. 5A is a face of a person.

In some examples, the content being displayed by kiosk 500 is a stream that is being captured by image sensor 520. In such examples, the display 510 can include button 530, which when selected (e.g., touch 531 on button 530) causes one or more operations to be performed on captured content. Button 530 can either be a virtual construct (e.g., an affordance in a virtual user interface) or a physical button (e.g., mechanical or electrical button on kiosk 500).

The one or more operations performed in response to selection of button 530 can be similar to or the same as those described above in FIG. 4B when an image is analyzed and a recommendation is provided.

In some examples, multiple recommendations are provided in response to selection of button 530, as depicted in FIG. 5B. For example, display 510 in FIG. 5B includes graphical representation 540 of a head-mounted device. Graphical representation 540 can visually depict one or more of the recommendations coupled to the head-mounted device. Display 510 further includes a list of one or more recommendations for the head-mounted device (e.g., 452A, 452B, 452C, and 452D). In one illustrative example, recommendation 452A corresponds to goggle size (e.g., an option to change a recommended goggle size), recommendation 452B corresponds to nose padding (e.g., an option to change a recommended nose padding), recommendation 452C corresponds to forehead padding (e.g., an option to change a recommended forehead padding), and recommendation 452D corresponds to cheek padding (e.g., an option to change a recommended cheek padding). In some examples, the one or more recommendations in the list can correspond to the one or more recommendations that are visually depicted.

In some examples, each item in the list is an affordance (e.g., recommendation 542A). Selection of an affordance can provide further information regarding a recommendation corresponding to the affordance.

In FIG. 5B, display 510 further includes next button 554 and back button 556. Next button 554 can either cause (1) a head-mounted device with the one or more recommendations to be approved and/or ordered or (2) a head-mounted device with the one or more recommendations to be brought to the person to try on. It should be recognized that the flow of FIGS. 5A-5B is merely an example of a potential flow and should not be limiting.

In some examples, recommendations can be provided on a display of a head-mounted display device. For example, a user might already have the head-mounted display device and the recommendations are used to improve an experience of the user.

Figure 6:
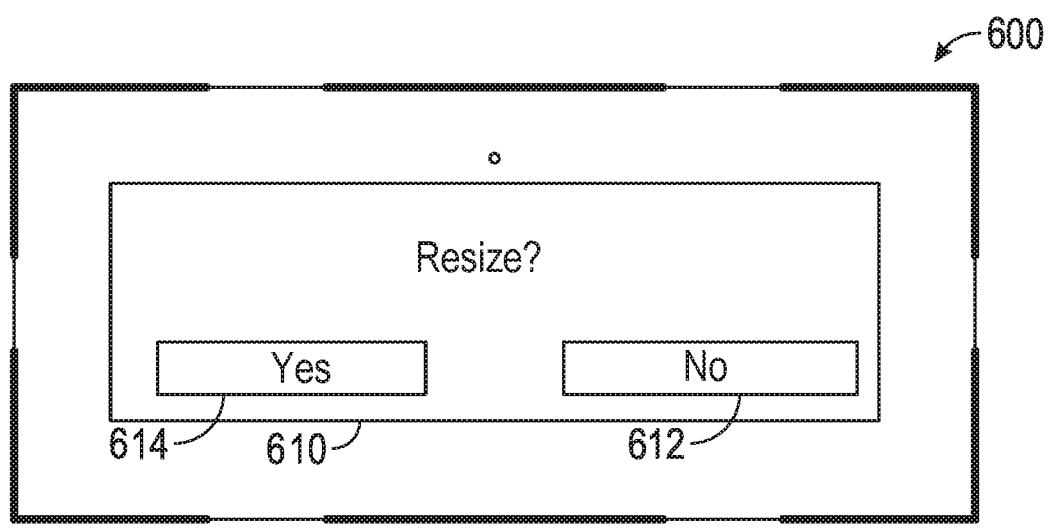
FIG. 6 illustrates an example of a hardware recommendation being output on a head-mounted device in accordance with some examples of this disclosure.

FIG. 6 illustrates a hardware recommendation being output on head-mounted device 600. The hardware recommendation is being output on display 610 and includes a recommendation for a different hardware component that can be used to improve the fit of head-mounted device 600.

In some examples, the recommendation can be based on one or more hardware components owned by the owner of head-mounted device 600. For example, the recommendation can be limited to the one or more hardware components owned by the owner of head-mounted device 600. For another example, the recommendation can be limited to one or more hardware components not owned by the owner of head-mounted device 600. In some examples, the recommendation can be merely a different hardware component than currently being used with head-mounted device 600, irrespective of whether owned by the owner of the head-mounted device 600.

As depicted in FIG. 6, display 610 further includes yes affordance 612 and no affordance 614. Selection of yes affordance 612 causes a process for resizing head-mounted device 600 to be initiated (e.g., purchasing the recommendation). A person of ordinary skill in the art will recognize how such a process can be conducted. Selection of no affordance 614 causes the recommendation to be removed from display 610. In some examples, selection of no affordance 614 further causes the recommendation to not be displayed again in the future when similar features are identified in an image.

Figure 7:
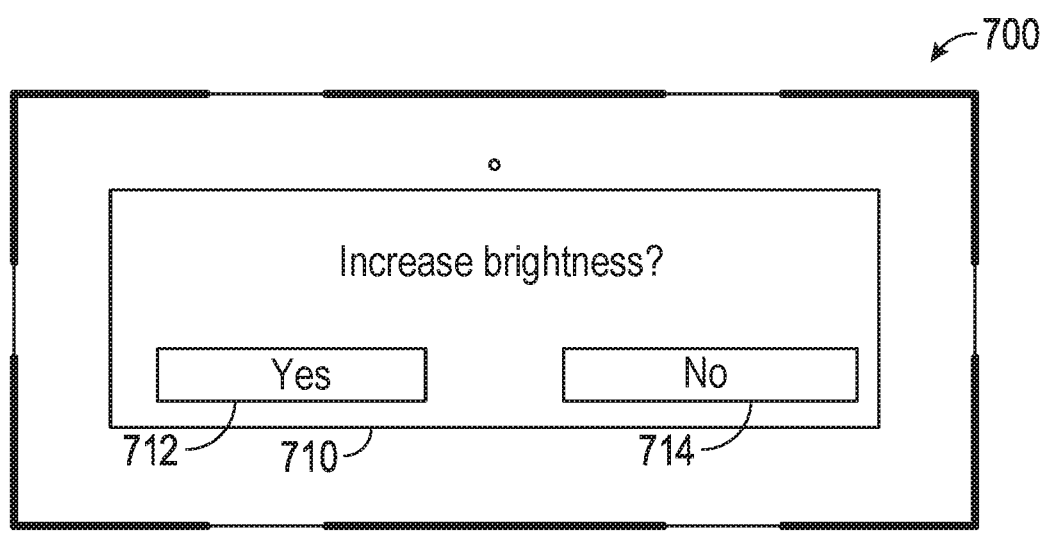
FIG. 7 illustrates an example of a software recommendation being output on a head-mounted device in accordance with some examples of this disclosure.

FIG. 7 illustrates a software recommendation being output on head-mounted device 700. The software recommendation is being output on display 710 and includes a recommendation for a different software setting that can be used to improve an experience with head-mounted device 700. In some examples, the recommendation can be based on one or more hardware components owned by the owner of head-mounted device 700.

As depicted in FIG. 7, display 710 further includes yes affordance 712 and no affordance 714. Selection of yes affordance 712 causes a process for changing the software setting to be initiated. A person of ordinary skill in the art will recognize how such a process can be conducted. For example, a brightness of head-mounted device 700 can be automatically updated in response to selection of yes affordance 712. For another example, a user interface can be displayed allowing a user to change the brightness of head-mounted device 700 (not illustrated). The user interface can include an indication corresponding to the recommendation so as to provide a suggestion (not illustrated).

Selection of no affordance 714 causes the recommendation to be removed from display 710. In some examples, selection of no affordance 714 further causes the recommendation to not be displayed again in the future when a similar recommendation is determined.

As described above, one aspect of the present technology is the gathering and use of data available from various sources to improve the configuration of a display device. The present disclosure contemplates that in some instances, this gathered data may include biometric information associated with the face of a person.

The present disclosure recognizes that the personal information data can be used to beneficially improve the configuration of a display device and its comfort. Entities responsible for the collection, analysis, disclosure, transfer, storage, or other use of such personal information data will comply with well-established privacy policies and/or privacy practices, including implementing and consistently using privacy policies and practices that are generally recognized as meeting or exceeding industry or governmental requirements for maintaining personal information data private and secure.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. For example, values representing pupil distance can be sent instead of an image of a person's pupils. Thus, it is envisioned that aspects of the present technology may be implemented while respecting the privacy of persons using the technology.

What is claimed is:

1. An electronic device, comprising:
   one or more processors; and
   memory storing one or more programs configured to be executed by the one or more processors, the one or more programs including instructions for:
   capturing, by a sensor of the electronic device, first sensor data corresponding to at least a portion of a face;
   identifying, using the first sensor data, a feature of the face;
   identifying, based on the feature, a configuration parameter associated with a head-mounted display device, wherein the head-mounted display device is different from the electronic device; and
   displaying, a representation of a physical component of the head-mounted display device based on the configuration parameter.

2. The electronic device of claim 1, wherein the configuration parameter is a recommendation of an adjustment to the head-mounted display device.

3. The electronic device of claim 1, wherein the configuration parameter is a size, shape, or model number of the physical component associated with the head-mounted display device.

4. The electronic device of claim 1, further comprising:
   outputting a second configuration parameter for changing a software component of the head-mounted display device.

5. The electronic device of claim 4, wherein the software component is a brightness of a display of the head-mounted display device.

6. The electronic device of claim 1, wherein the configuration parameter is identified based on a plurality of features of the face.

7. The electronic device of claim 6, wherein the plurality of features include at least one or more of an attribute of a nose of the face, an attribute of one or more cheeks of the face, an attribute of one or more eyes of the face, or an attribute of a forehead of the face.

8. The electronic device of claim 7, wherein the configuration parameter is identified based on a depth of the forehead of the face with respect to the one or more eyes of the face or a position of the one or more cheeks of the face with respect to the one or more eyes of the face.

9. The electronic device of claim 1, wherein outputting the configuration parameter causes the head-mounted display device to change a size of a hardware component of the head-mounted display device.

10. The electronic device of claim 1, wherein the head-mounted display device includes a display for outputting computer-generated reality content.

11. The electronic device of claim 1, wherein the feature of the face corresponds to a topology of the face.

12. The electronic device of claim 1, the one or more programs further including instructions for:
   identifying a current physical component coupled to the head-mounted display device; and
   in accordance with a determination that the current physical component is not configured consistent with the configuration parameter, displaying a recommendation to replace the current physical component with a different physical component that is configured consistent with the configuration parameter.

13. The electronic device of claim 12, wherein the current physical component is a replaceable cushion.

14. The electronic device of claim 12, wherein the current physical component includes a component to communicate one or more characteristics of the current physical component to the head-mounted display device, and wherein the current physical component is identified based on the one or more characteristics.

15. The electronic device of claim 1, the one or more programs further including instructions for:
   after receiving the first sensor data, receiving second sensor data;
   identifying, based on the second sensor data, a refined configuration parameter associated with the head-mounted display device; and
   outputting the refined configuration parameter for changing a fit of the head-mounted display device to the face.

16. The electronic device of claim 15, wherein the first sensor data is a first type, and wherein the second sensor data is a second type different from the first type.

17. The electronic device of claim 15, wherein the second sensor data corresponds to use of the head-mounted display device.

18. The electronic device of claim 1, wherein the first sensor data is captured by a sensor of the head-mounted display device.

19. The electronic device of claim 18, wherein the sensor is an image sensor, a depth sensor, or a temperature sensor.

20. The electronic device of claim 18, the one or more programs further including instructions for:
   displaying a plurality of representations of physical components associated with the head-mounted display device, wherein each of the plurality of representations corresponds to a same part of the head-mounted display device;
   receiving a selection of an affordance corresponding to at least one physical component of the plurality of representations of physical components;
   sending a request for the at least one physical component; and
   after sending the request, receiving a selection to purchase the at least one physical component.

21. The electronic device of claim 1, wherein the first sensor data is captured by a sensor of a computing device different from the head-mounted display device.

22. The electronic device of claim 1, the one or more programs further including instructions for:
   in response to receiving user selection of an affordance associated with the physical component, sending, by the computing device, a request for the physical component.

23. A non-transitory computer-readable storage medium storing one or more programs configured to be executed by one or more processors of an electronic device, the one or more programs including instructions for:
   capturing, by a sensor of the electronic device, first sensor data corresponding to at least a portion of a face;
   identifying, using the first sensor data, a feature of the face;
   identifying, based on the feature, a configuration parameter associated with a head-mounted display device, wherein the head-mounted display device is different from the electronic device; and
   displaying, a representation of a physical component of the head-mounted display device based on the configuration parameter.

24. The non-transitory computer-readable storage medium of claim 23, wherein the configuration parameter is a size, shape, or model number of the physical component associated with the head-mounted display device.

25. The non-transitory computer-readable storage medium of claim 23, the one or more programs further including instructions for:
   identifying a current physical component coupled to the head-mounted display device; and
   in accordance with a determination that the current physical component is not configured consistent with the configuration parameter, displaying a recommendation to replace the current physical component with a different physical component that is configured consistent with the configuration parameter.

26. The non-transitory computer-readable storage medium of claim 23, the one or more programs further including instructions for:
   after receiving the first sensor data, receiving second sensor data;
   identifying, based on the second sensor data, a refined configuration parameter associated with the head-mounted display device; and
   outputting the refined configuration parameter for changing a fit of the head-mounted display device to the face.

27. A method related to configuring a head-mounted display device, the method comprising:
   capturing, by a sensor of an electronic device, first sensor data corresponding to at least a portion of a face;
   identifying, using the first sensor data, a feature of the face;
   identifying, based on the feature, a configuration parameter associated with the head-mounted display device, wherein the head-mounted display device is different from the electronic device; and displaying, a representation of a physical component of the head-mounted display device based on the configuration parameter.

28. The method of claim 27, wherein the configuration parameter is a size, shape, or model number of the physical component associated with the head-mounted display device.

29. The method of claim 27, further comprising:
identifying a current physical component coupled to the head-mounted display device; and
in accordance with a determination that the current physical component is not configured consistent with the configuration parameter, displaying a recommendation to replace the current physical component with a different physical component that is configured consistent with the configuration parameter.

30. The method of claim 27, further comprising:
after receiving the first sensor data, receiving second sensor data;
identifying, based on the second sensor data, a refined configuration parameter associated with the head-mounted display device; and
outputting the refined configuration parameter for changing a fit of the head-mounted display device to the face.

* * * * *

UNITED STATES PATENT AND TRADEMARK OFFICE
CERTIFICATE OF CORRECTION

PATENT NO. : 11,181,973 B2  
APPLICATION NO. : 16/859675  
DATED : November 23, 2021  
INVENTOR(S) : Ivan S. Maric et al.

Page 1 of 1

It is certified that error appears in the above-identified patent and that said Letters Patent is hereby corrected as shown below:

In the Claims

Column 16, Line 51: In Claim 1, delete "displaying," and insert -- displaying --, therefor.

Column 18, Line 30: In Claim 23, delete "displaying," and insert -- displaying --, therefor.

Column 19, Line 1: In Claim 27, delete "displaying," and insert -- displaying --, therefor.

Signed and Sealed this  
Twenty-second Day of July, 2025

Coke Morgan Stewart  
*Acting Director of the United States Patent and Trademark Office*